(12) United States Patent  
Mizutani

(10) Patent No.: US 7,139,021 B2
(45) Date of Patent: Nov. 21, 2006

(54) IMAGE INPUT APPARATUS THAT CAN TRANSMIT INPUT IMAGE

(75) Inventor: Koichi Mizutani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 09/946,496

(22) Filed: Sep. 6, 2001

(65) Prior Publication Data

US 2002/0030750 A1 Mar. 14, 2002

(30) Foreign Application Priority Data

Sep. 11, 2000 (JP) ............................. 2000-275302

(51) Int. Cl.
*H04N 5/76* (2006.01)
*H04N 5/232* (2006.01)

(52) U.S. Cl. ................. 348/231.9; 348/211.1
(58) Field of Classification Search ........... 348/231.99, 348/372, 221.1, 231.3, 231.7, 231.9, 207.99, 348/231.1, 376
See application file for complete search history.

(56) References Cited

U.S. PATENT DOCUMENTS 5,204,893 A * 4/1993 Choi et al. ............... 348/14.12
5,293,236 A * 3/1994 Adachi et al. ........... 348/231.2
5,479,206 A 12/1995 Ueno et al. .................. 348/211
5,778,195 A * 7/1998 Gochi ......................... 710/301
5,818,846 A 10/1998 Mori et al.
5,875,034 A * 2/1999 Shintani et al. ............. 358/296
6,148,141 A * 11/2000 Maeda et al. ............... 386/112
6,686,958 B1 * 2/2004 Watanabe et al. ......... 348/231.1

FOREIGN PATENT DOCUMENTS

| JP | 5-153454 | 6/1993 |
|----|----------|--------|
| JP | 8-205105 | 8/1996 |
| JP | 9-83930  | 3/1997 |

* cited by examiner

*Primary Examiner*—Thai Tran
*Assistant Examiner*—Heather R. Jones
(74) *Attorney, Agent, or Firm*—Fitzpatrick, Cella, Harper & Scinto

(57) ABSTRACT

An image memory used for processing signals from a camera can be released within a short period of time. Specifically, when all of the image data are transmitted to a buffer memory, a control circuit in a camera relinquishes processing control of an imaging circuit, an encode buffer memory, a frame memory, an image codec and an IC card interface circuit, so that these sections are released when the communication circuit initiates communication with the exterior.

5 Claims, 11 Drawing Sheets

IMAGE INPUT APPARATUS THAT CAN TRANSMIT INPUT IMAGE

BACKGROUND OF THE INVENTION

1. Field of the Invention

The present invention relates to an image input apparatus that can transmit input images, a control method therefore, and a storage medium on which a control program for the image input apparatus is stored.

2. Related Background Art

A conventional digital camera merely records image signals, obtained by a photographing operation, on a storage medium appropriate for the camera being used. Recently, however, not only are digital image data being compressed and recorded internally by cameras, but as needed, image data are transmitted externally by using communication means incorporated in the cameras. Furthermore, in addition to communication means being installed, provision has been made for the mounting in cameras of communication cards, similar in shape to memory cards, that permit the implementation of modem and various other communication functions.

An example of this type of camera has already been disclosed in Japanese Laid-open Patent Application No. 9-83930.

However, in this prior art, when an image recorded by a digital camera is to be transmitted externally using communication means provided by an added media card or permanently installed in the camera, the communication means reads the image directly from internal memory. Therefore, if the communication means, such as a modem or a radio transmitter, has a low transmission speed, an extended time is required to retrieve and transmit images stored in the camera memory, and during the transmission process, no new images can be added since the performance of the photographing process is inhibited.

In addition, when the transmission of image data must be repeated because the connection to a communication line is lost or the quality of the transmission afforded by the line is deteriorated, the image data must be retransmitted, from the beginning, and all other camera operations are inhibited until the retransmission has been completed. Further, the electricity required for the transmission of the same data is simply wasted.

SUMMARY OF THE INVENTION

It is, therefore, one objective of the present invention to release, within a short period of time, an image memory for which input image signal processing is performed.

It is another objective of the present invention to eliminate the unnecessary transmission of data and to thus shorten transmission communication time and reduce the consumption of power.

It is an additional objective of the present invention to exercise power control for communication separate from power control for other camera functions, so that a user can immediately power off a camera without having to take into consideration the time required to complete an ongoing transmission of data, and can thus halt the performance of camera functions that are not required in a short period of time, and can reduce overall the power consumed by the camera.

Other objectives of the present invention will become apparent during the course of the following description given while referring to the accompanying drawings.

DETAILED DESCRIPTION OF THE PREFERRED EMBODIMENTS

The preferred embodiments of the present invention will now be described in detail while referring to the accompanying drawings.

[First Embodiment]

Figure 1:
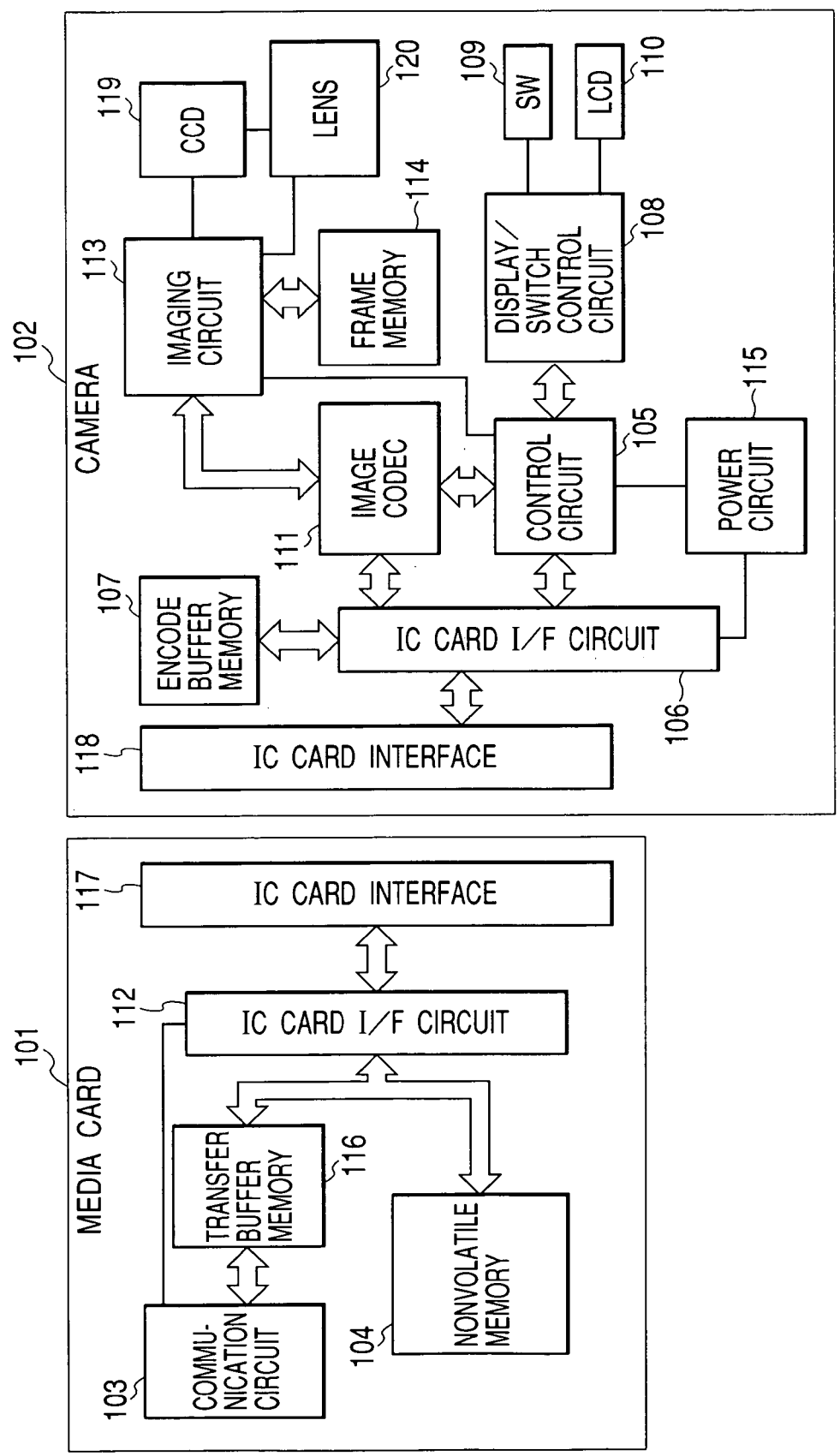
FIG. 1 is a block diagram showing the configuration of a photographing system comprising a media card and a camera according to a first embodiment of the present invention.

FIG. 1 is a block diagram showing the configuration of a photographing system comprising a media card and a camera according to a first embodiment of the present invention. A media card 101 comprises a communication circuit 103, a nonvolatile memory 104, an IC card I/F circuit 112, a transfer buffer memory 116, and an IC card interface 117. A camera 102 comprises a control circuit 105, an IC card I/F circuit 106, an encode buffer memory 107, a display/switch control circuit 108, a switch 109, an image display LCD 110, an image codec (CoderDecoder) 111, an imaging circuit 113, a frame memory 114, a power circuit 115, an IC card interface 118, a CCD 119, and a lens 120.

More specifically, the media card 101 includes communication means and nonvolatile storage means for storing image data, and is detachably loaded into the camera 102. The communication circuit 103, for example, is a radio transmission circuit, which includes a control protocol for data transmission and which communicates with an external device. The nonvolatile memory 104 is used to store image data recorded by the camera 102, and is, for example, a flash ROM.

The IC card I/F circuit 112 is an interface circuit for permitting the exchange of data by the media card 101 and the camera 102. The transfer buffer memory 116 is used to temporarily store image data to be transmitted to the communication circuit 103, while the IC card interface 17 serves as an interface between the media card 101 and the camera 102.

In the camera 102, the control circuit 105 is a circuit for controlling the operations performed in this embodiment, and based on a program, performs the processes shown in the flowcharts, which will be described later. The IC card I/F circuit 106 is an interface circuit for permitting the exchange of data by the camera 102 and the media card 101, and the encode buffer memory 107 is used to temporarily store image data that is obtained, for example, by performing JPEG (Joint Photographic Expert Group: color still picture compression method) encoding for the image data obtained by the camera 102.

The display/switch control circuit 108 controls the switch 109 and the image display LCD 110 mounted in the camera 102. The switch 109 is constituted by a photographing switch, for instructing image pickup, and a menu switch, for menu selection. The image display LCD 110 is display means for permitting a user to confirm an image while or after photographing it. The image codec 111 compresses and encodes or decodes image data, and in accordance with an instruction from the control circuit 105, the imaging circuit 113 controls an optical system, such as a zooming system, as well as converting an image signal received from the CCD 119 into image data.

The frame memory 114 is used to store uncompressed image data generated by the imaging circuit 113. The power circuit 115 supplies power to the individual sections of the camera 102. The IC card interface 118 serves as an interface between the camera 102 and the media card 101. And the CCD 119 performs a photoelectric conversion process for converting into an electric signal an object image obtained by the lens 120.

Figure 2:
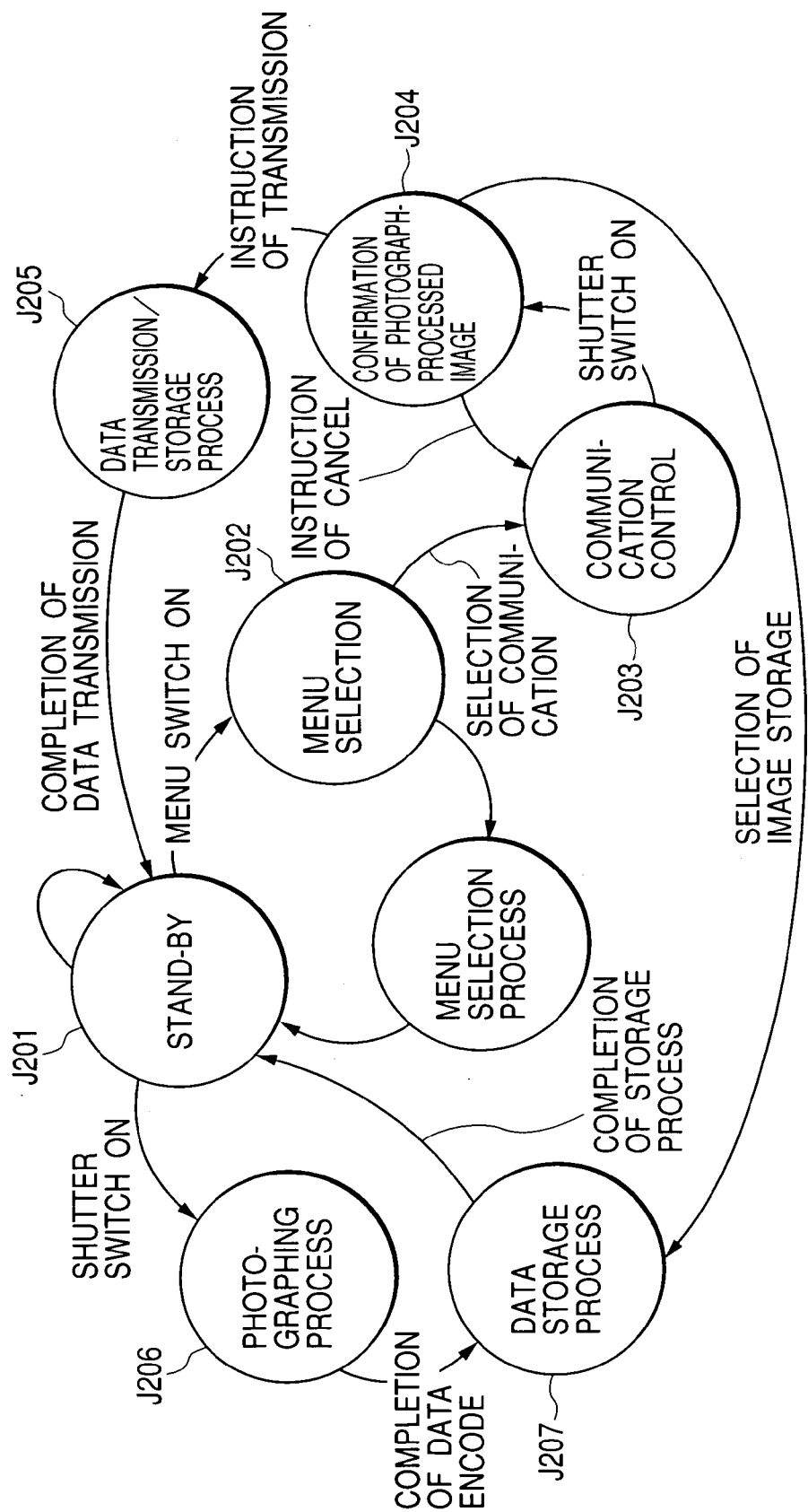
FIG. 2 is a state shifting diagram showing the processing state of the control circuit of the camera in the photographing system according to the first and second embodiment.

FIG. 2 is a diagram showing the shifting of the processing state of the control circuit 105 of the camera 102 in this embodiment. In FIG. 2, J201 indicates a standby state wherein the camera 102, which is powered on by a power switch (not shown), has been initialized and is waiting to receive a user instruction. J202 indicates a menu selection state wherein, when a user selects a menu by using the switch 109 of the camera 102, a function menu for the camera 102 is displayed and a function is selected. J203 indicates a communication control state to which the process is shifted when a user has selected a communication function from the menu.

J204 indicates a state to which the process is shifted when the user has selected the communication function and has manipulated the switch 109. In this state, image data obtained by the camera 102 is encoded and the encoded data is temporarily stored in the encode buffer memory 107. J205 indicates the state to which the process is shifted when the user has selected the communication function and has then selected the transmission of image data obtained by the camera 102. In this state, the data temporarily stored in the encode buffer memory 107 is transferred to the media card 101. The data is then stored in the nonvolatile memory 104 and is transmitted by the communication circuit 103. J206 indicates the photographing process, and J207 indicates the data storage process.

Figure 3:
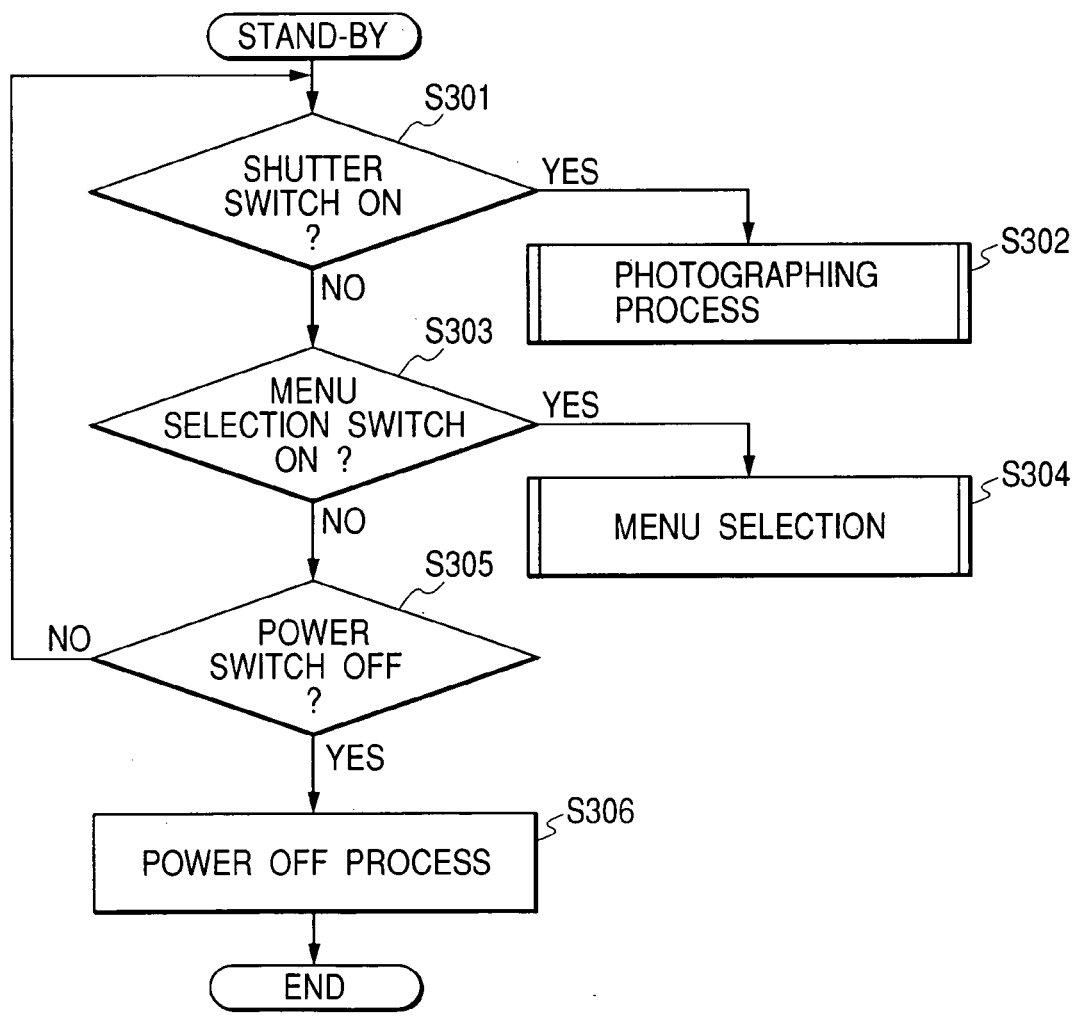
FIG. 3 is a flowchart showing the operation performed by the photographing system while in the standby state according to the first and second embodiments.
Figure 4:
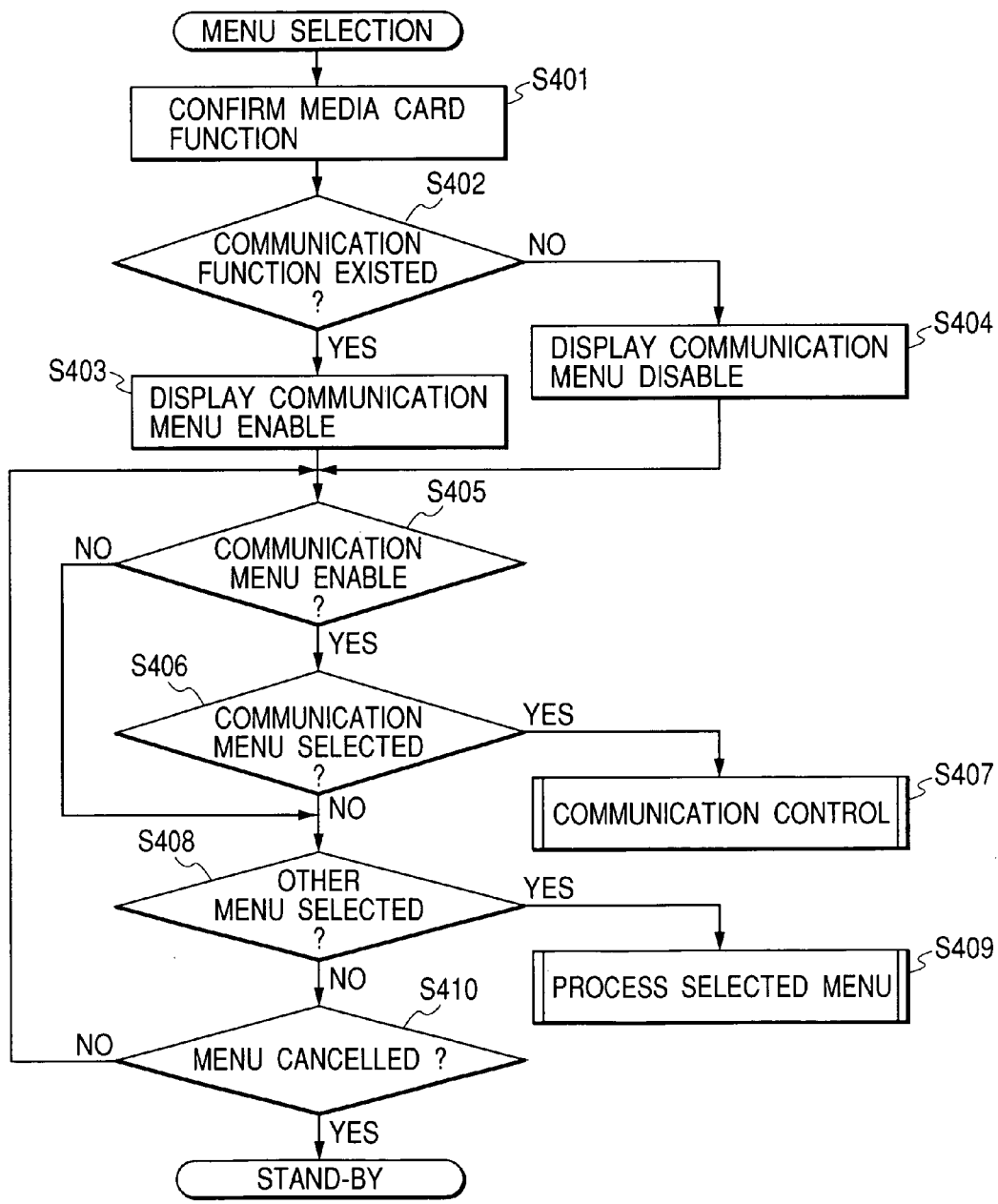
FIG. 4 is a flowchart showing the operation performed by the photographing system while in the menu selection state according to the first embodiment.
Figure 5:
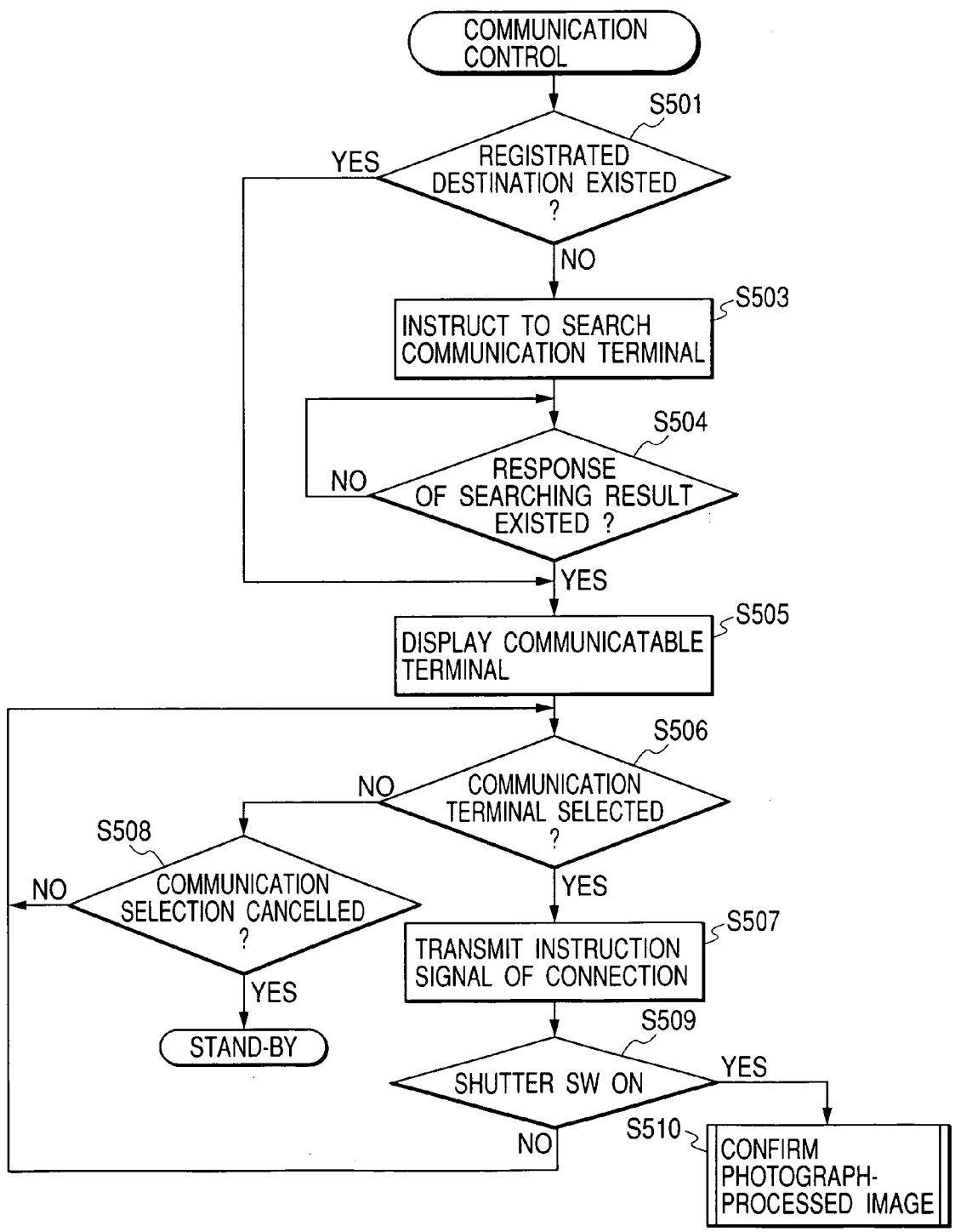
FIG. 5 is a flowchart showing the operation performed by the photographing system in the communication control state according to the first embodiment.
Figure 6:
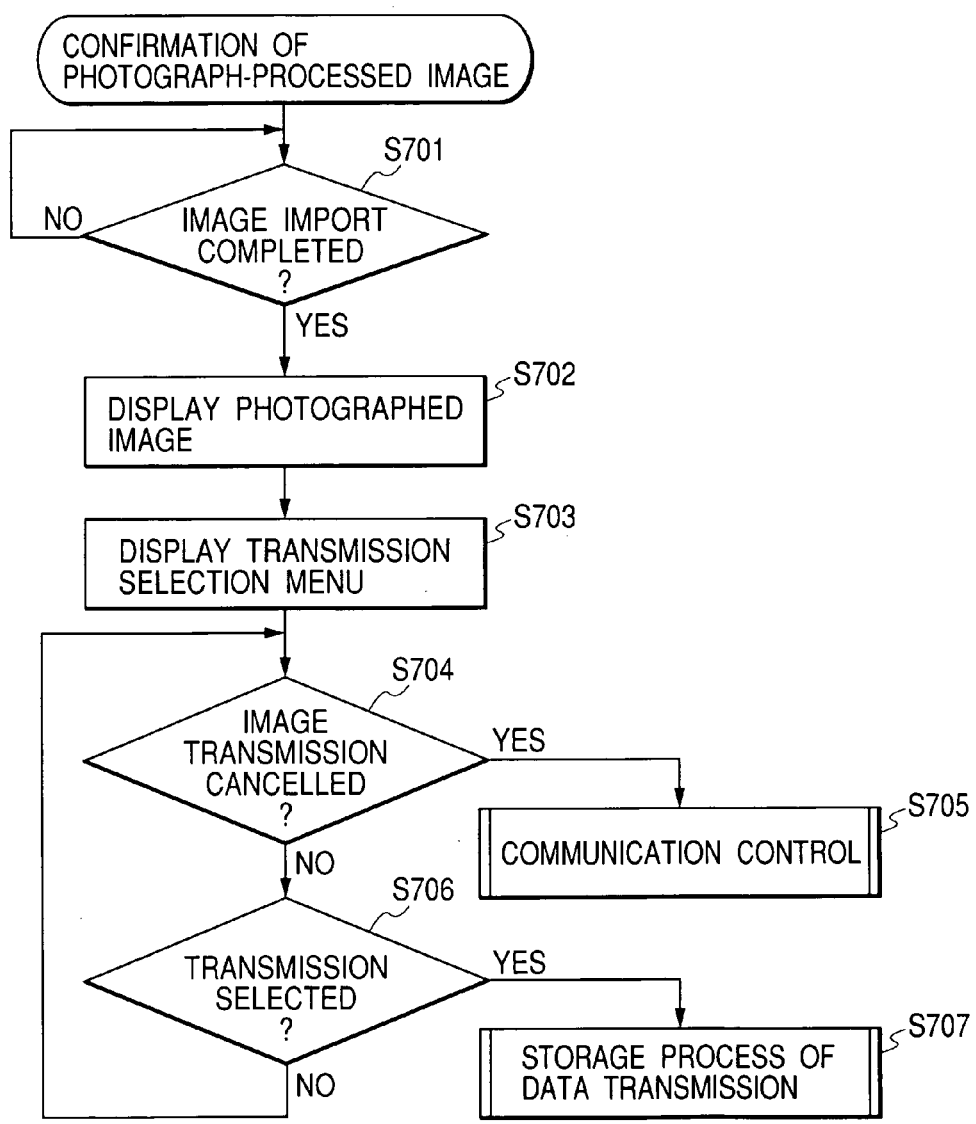
FIG. 6 is a flowchart showing the operation performed by the photographing system in the photograph-processed image confirmation state according to the first embodiment.
Figure 7:
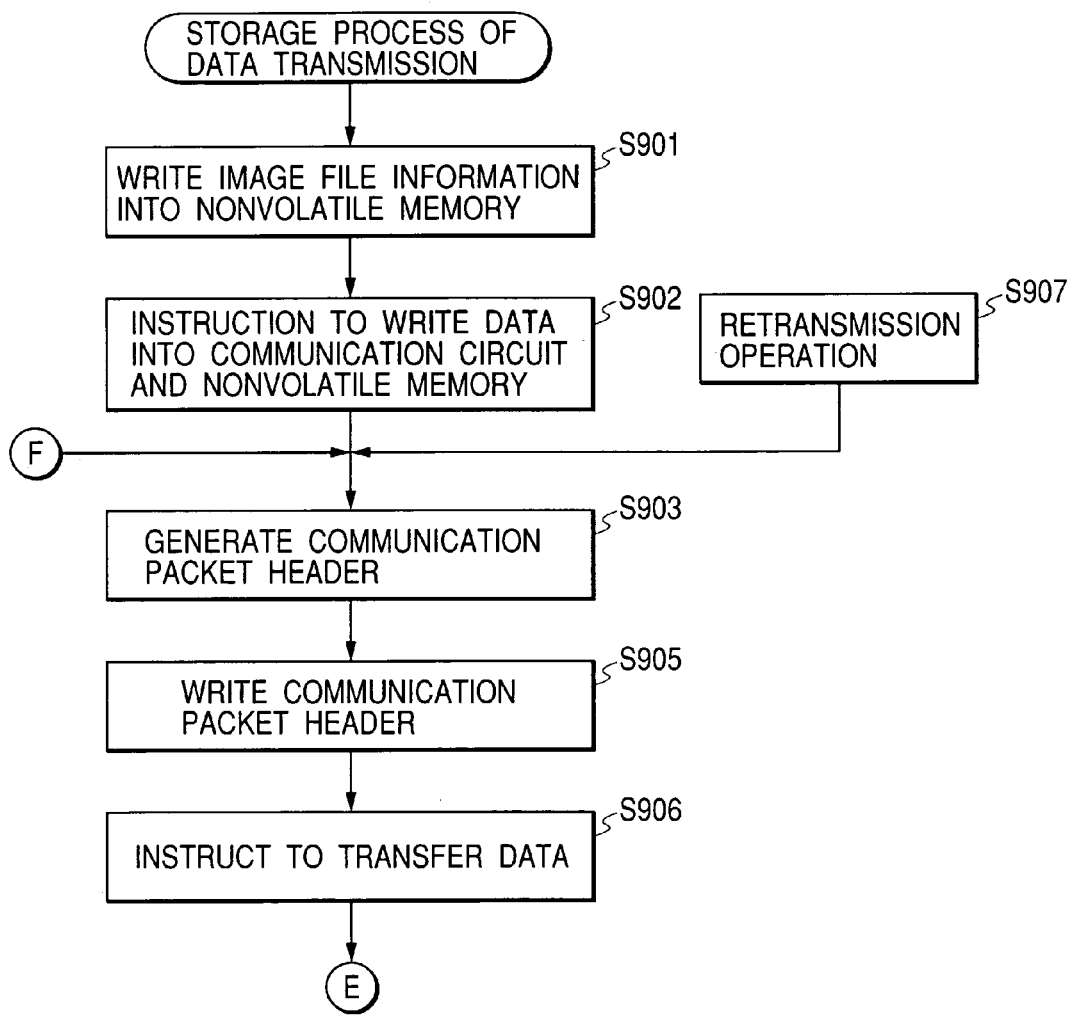
FIG. 7 is a flowchart showing the data transmission/storage process performed by the photographing system according to the first embodiment.
Figure 8:
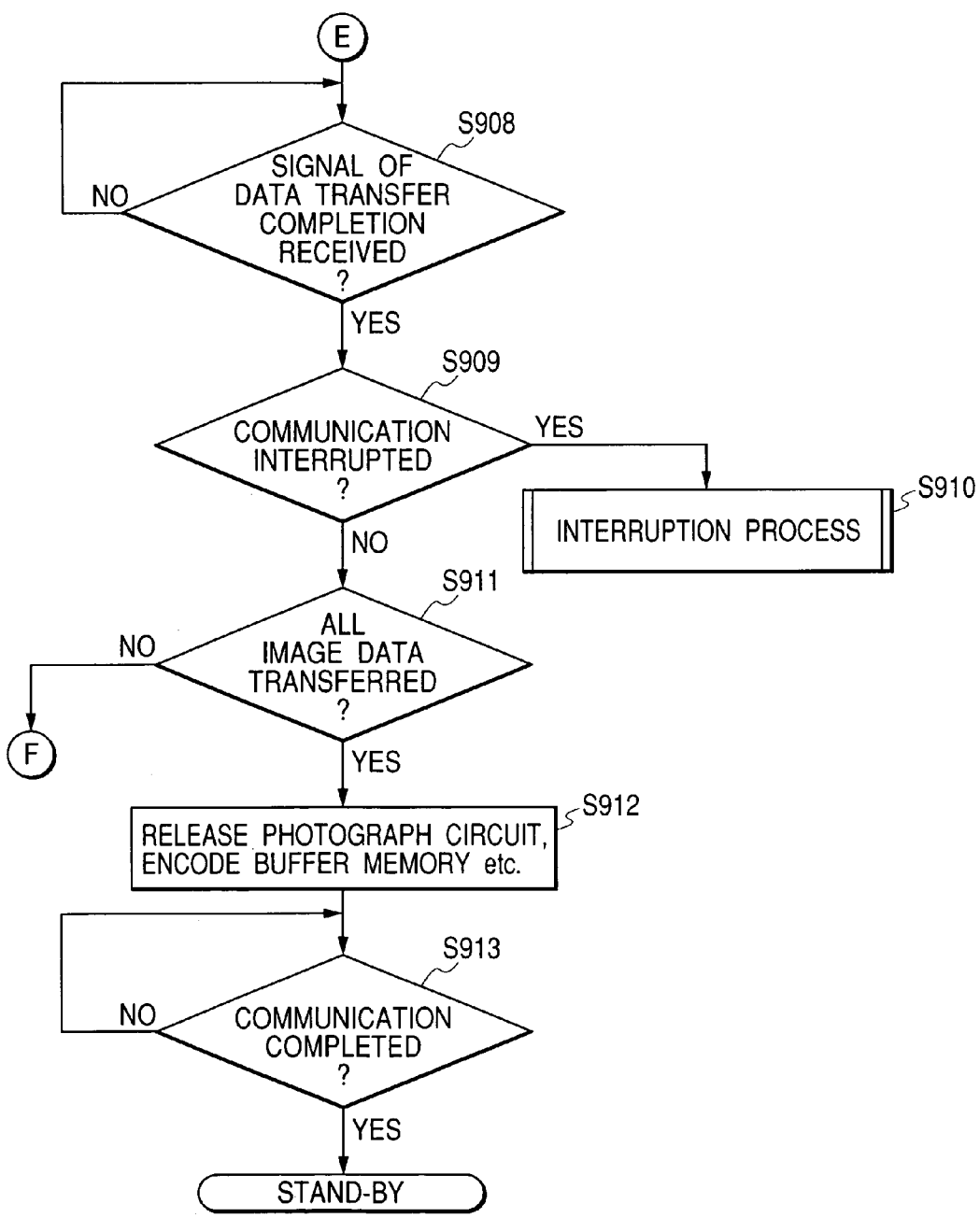
FIG. 8 is a flowchart showing the data transmission/storage process performed by the photographing system according to the first embodiment.
Figure 9:
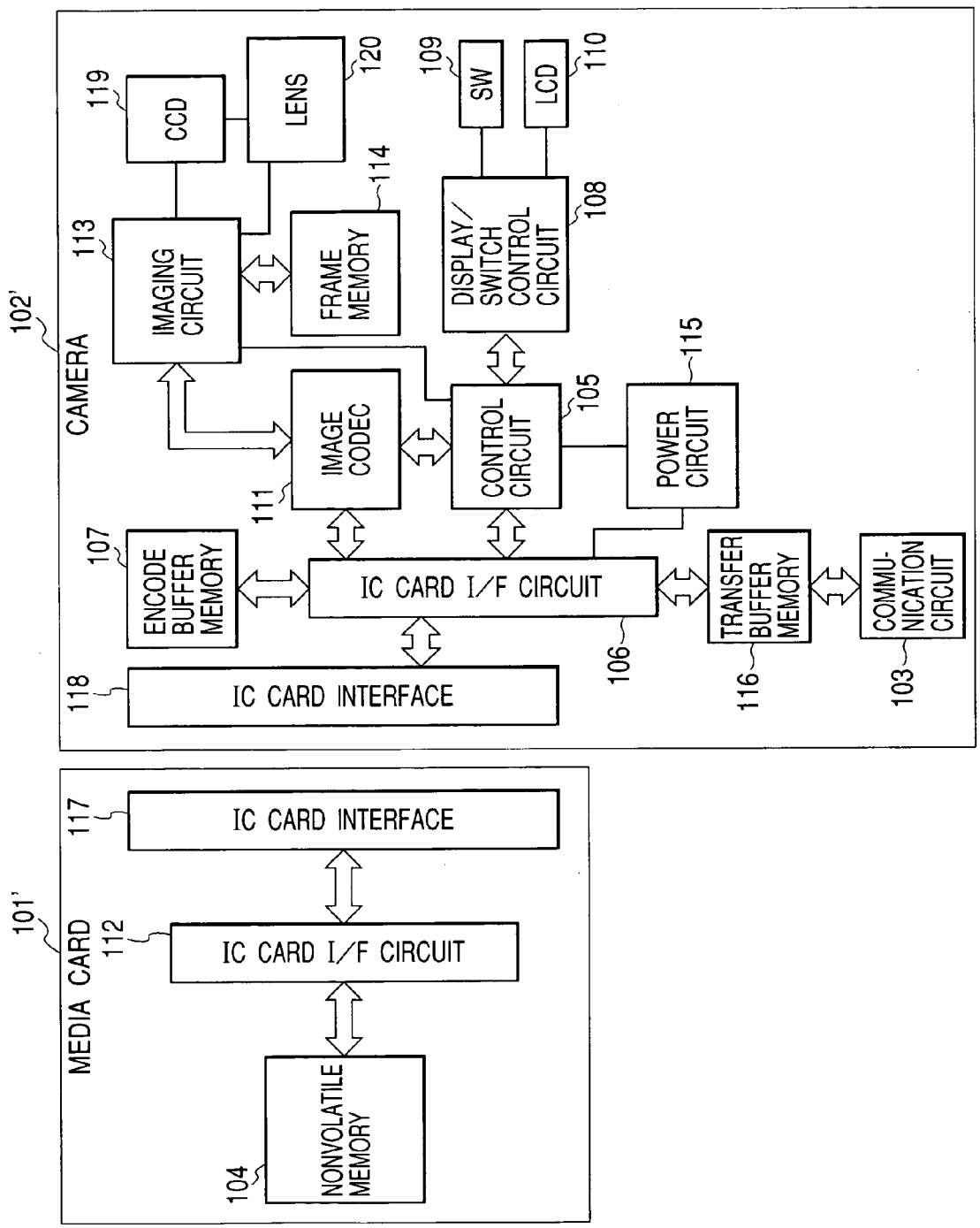
FIG. 9 is a block diagram showing the configuration of a photographing system comprising a media card and a camera according to a second embodiment of the present invention.
Figure 10:
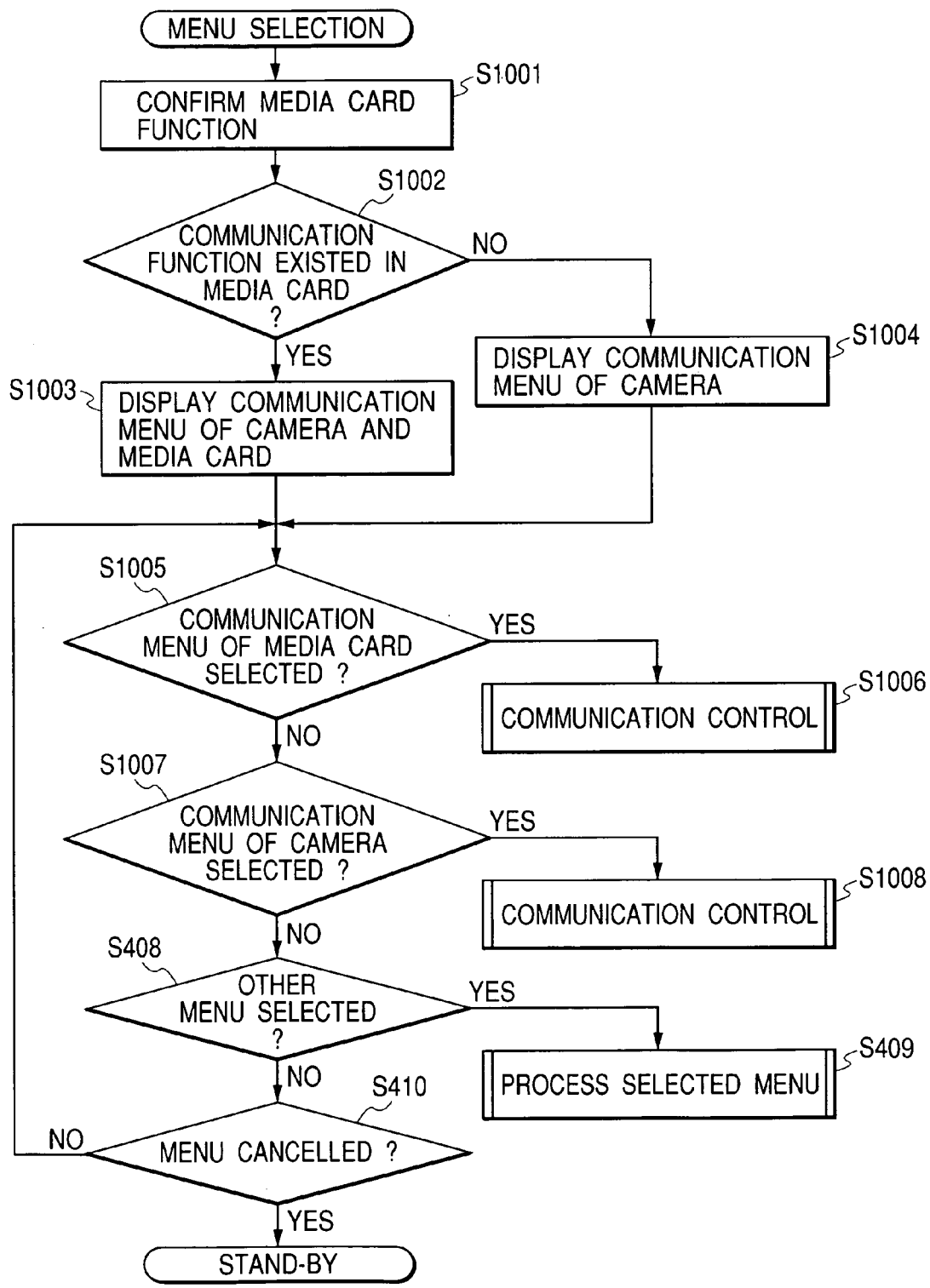
FIG. 10 is a flowchart showing the operation performed by the photographing system in the menu selection state according to the second embodiment.

A specific operation for the thus arranged photographing system according to the embodiment will now be described in detail. FIG. 3 is a flowchart showing the processing in the standby state; FIG. 4 is flowchart showing the processing in the menu selection state; FIGS. 5 and 6 are flowcharts showing the processing in the communication control state; FIGS. 7 and 8 are flowcharts showing the processing in the photographing-processed image confirmation state; and FIGS. 9 and 10 are flowcharts showing the processing in the data transmission/storage process.

First, the normal photographing process will be described. When the user powers on the camera 102 by manipulating its power switch, the control circuit 105 initializes the camera 102, which is then shifted to the standby state. Then, after the user manipulates the photographing switch in the switch 109 (step S301 in FIG. 3), the control circuit 105 ascertains that normal photographing is being performed and is shifted to the photographing processing state J206 (step S302) to output an image reading instruction to the imaging circuit 113.

Upon receiving an instruction, the imaging circuit 113 obtains image data based on an image signal from the CCD 119 and stores the image data in the frame memory 114. Then, the imaging circuit 113 outputs an image data compression/encoding instruction to the image codec 111. Upon receiving this instruction, the image codec 111 performs data conversion, and temporarily stores the resultant image data in the encode buffer memory 107 via the IC card interface circuit 106. Then, the image codec 111 notifies the control circuit 105 that the processing has been completed.

Upon receiving this notification, the control circuit 105 is shifted to the data storage processing state J207. The control circuit 105 writes information, such as a storage date, into the nonvolatile memory 104 in the media card 101, and transmits the image data encoded by the encode buffer memory 107 via the IC card interface 118 to the media card 101. When the transmission is completed, the control circuit 105 is shifted to the standby state J201 and waits for a new user instruction.

The processing performed when the communication operation is selected will now be described. When the user manipulates the menu switch in the switch 109 while the control circuit 105 is in the standby state (step S303), the control circuit 105 is shifted to the menu selection state J202 and displays a menu for a photographing mode, image deletion and communication. Then, the control circuit 105 is shifted to the menu selection process in FIG. 4 to wait for the next operation (step S304), and when the power switch is turned off (step S305), the power OFF process is performed (step S306).

During the menu selection process, the control circuit 105 determines whether a media card 101 has been loaded in the camera 102. When a media card 101 has been loaded in the camera 102, the function of the media card 101 is examined (step S401 in FIG. 4), and if it is ascertained that the loaded media card 101 has a communication function, the menu for communication is presented as valid (steps S402 and S403).

When it is ascertained that the loaded media card 101 does not have a communication function, the menu for communication is presented as invalid to inhibit the selection of communication (steps S402 and S404).

When the communication menu is displayed as valid (step S405) and when the communication is selected (step S406), the control circuit 105 is shifted to the communication control state J203 (step S407). First, the control circuit 105 issues, to the communication circuit 103 of the media card 101, an instruction for detecting a communication enabled device present in a communication range, and waits for a response.

When another menu is selected (step S408), the pertinent process is performed (step S409). When the displayed menu is canceled (step S410), the control circuit 105 is returned to the standby state.

When the communication circuit 103 receives the detection instruction from the control circuit 105 and when a fixed communication destination has been registered in advance (step S501 in FIG. 5), information concerning the registered party is transmitted to the control circuit 105, whereas if a communication destination has not been registered, a communication enabled terminal is searched for in the communication range (step S503), and when an affirmative response to the search is obtained (step S504), all the terminal information is transmitted to the control circuit 105 of the camera 102. The control circuit 105 then displays the received information on the image display LCD 110 via the display/switch control circuit 108 (step S505) and waits for a user to make a communication destination selection.

After the user has manipulated the switch 109 and selected, from the displayed information, a communication destination (step S506), the display/switch control circuit 108 transmits the selected information to the control circuit 105. Thereafter, based on the selected information, the control circuit 105 transmits a connection instruction signal to the communication circuit 103 of the media card 101 (step S507) and waits for the manipulation of the photographing switch in the switch 109, as well as the entry into the standby state J201 for a normal photographing operation (step S509). Moreover, when a communication selection is cancelled in the step S508, a processing state shifts to standby state J201.

Based on the received connection instruction signal, the communication circuit 103 establishes a connection with the selected communication destination. Then, after this connection has been established, the communication circuit 103 transmits a connection complete notification to the control circuit 105 of the camera 102.

Thereafter, when the user manipulates the photographing switch in the switch 109 (step S509), the display/switch control circuit 108 transmits a photographing instruction signal to the control circuit 105, and upon receiving this signal, the control circuit 105 is shifted to the photographing-processed image confirmation state J204 (step S510). In the same manner as in the above process, the control circuit 105 outputs an image reading instruction to the imaging circuit 113, and the imaging circuit 113 fetches a series of image data (step S701 in FIG. 6). Subsequently, the image data is read from the frame memory 114, and is displayed on the image display LCD 110 via the display/switch control circuit 108 (step S702).

The user then confirms the image on the image display LCD 110, and after this image data is transmitted, the user manipulates the switch 109 to display an image data transmission instruction menu and selects this menu. At this time, the user manipulates the switch 109 to cancel the photographed image (step S704). Then, when the control circuit 105 receives the cancel instruction signal from the display/switch control circuit 108, the control circuit 105 is shifted to the communication control state J203 (step S705), where a new photographing instruction is waited for.

When the user confirms the image obtained by the camera 102, and manipulates the switch 109 to display a transmission menu (step S703) and selects the menu (step S706), the control circuit 105 is shifted to the data transmission/storage process J205 (step S707).

During the data transmission/storage process, first, data, such as a file name and a storage date, are written in the nonvolatile memory 104 of the media card 101 (step S901 in FIG. 7). Then, an instruction signal is output to the IC card interface circuit 112 in the media card 101 to write common data in the transfer buffer memory 116 of the communication circuit 103 and the nonvolatile memory 104 (step S902).

Thereafter, a communication packet header, which includes header information indicating data for the communication information 103 and the length of the data to be transmitted, is generated (step S903). Moreover, initiation of the retransmission operation (step S907), causes a communication packet header to be generated (step S903). The communication packet is written to the IC card interface circuit 112 of the media card 101 (step S905). An instruction is then transmitted to the interface circuit 106 of the camera 102 for the transmission, from the encode buffer memory 207, of image data having a length designated in the communication packet header (step S906). Upon receiving this instruction, the IC card interface circuit 106 transmits from the buffer memory 107 image data having the designated length, and when the transmission has been completed, a transmission complete signal is output to the control circuit 105 (step S908).

Upon receiving the communication packet header, the IC card interface circuit 112 of the media card 101 transmits only the header information to the transfer buffer memory 116, and at the same time, sequentially transmits the image data to the transfer buffer memory 116 and the nonvolatile memory 104.

This process is repeated until the transmission of all the necessary image data has been completed. Then, when all the image data have been transmitted to the transfer buffer memory 116 (step S911), the control circuit 105 of the camera 102 relinquishes processing control of the imaging circuit 113, the encode buffer memory 107, the frame memory 114, the image codec 111 and the IC card interface circuit 106 (step S912).

Thereafter, the communication circuit 103 is activated to initiate the communication with an external device. Therefore, since the use of the imaging circuit 113, the encode buffer memory 107, the frame memory 114, the image codec 111 and the IC card interface circuit 106 for the transmission of the encoded image data is not required, these components are released. Then, when the communication has been completed (step S913), the processing is terminated and the control circuit 105 is shifted to the standby state J201.

However, when a communication interrupt instruction is received before the transmission of all the image data has been completed at step S911 (step S909), the communication is interrupted (step S910).

As is described above, according to the photographing system of this embodiment, the transfer buffer memory 116, which has a capacity large enough to store all the image data received from the camera 102, is provided for the media card 101. Therefore, when the image data to be transmitted by the camera 102 is temporarily transferred at high speed to the transfer buffer memory 116, the employment of the encode buffer memory 107, used for the signal processing of the camera 102, can be halted within a short period of time.

In addition, the image data to be transmitted by the camera 102 is transferred to the transfer buffer memory 116, which is connected to the communication circuit 103 of the media card 101. Therefore, if during the communication the line is disconnected for a specific reason, and the retransmission of data is required, the camera 102 need merely issue a communication instruction to the communication circuit 103. In this fashion, the unnecessary transfer of data to the communication circuit 103 can be avoided, and the consumption of power reduced.

Furthermore, when the control of the power for the communication circuit 103 of the media card 101 is exercised independent of the control of the power for the camera 102, immediately after the image data obtained by the camera 102 has been transmitted to the communication circuit 103 of the media card 101 the user can power off the camera 102 without having to take into consideration, or having any knowledge of, the time at which the communication will actually be completed. Therefore, the user can be relieved of responsibility for the operation of the camera 102 in a short period of time, and in addition, the unnecessary consumption of power for camera 102 functions that are not required can be reduced.

[Second Embodiment]

FIG. 9 is a block diagram showing the configuration of a photographing system, according to a second embodiment of the invention, that comprises a media card and a camera. A media card 101' includes a nonvolatile memory 104 and an IC card I/F circuit 112, and an IC card interface 117. A camera 102' includes a communication circuit 103, a control circuit 105, an IC card I/F circuit 106, an encode buffer memory 107, a display/switch control circuit 108, a switch 109, an image display LCD 110, an image codec (Coder-Decoder) 111, an imaging circuit 113, a frame memory 114, a power circuit 115, a transfer buffer memory 116, an IC card interface 118, a CCD 119, and a lens 120.

A difference between the second embodiment and the first embodiment is that in the second embodiment the communication circuit 103 and the transfer buffer memory 116, which are mounted on the media card 101 in the first embodiment, are mounted in the camera 102'. But while the communication circuit 103 and the transfer buffer memory 116 are mounted in the camera 102', the same operation as in the first embodiment can be performed, and since the remainder of the configuration is the same as that in the first embodiment, no further explanation for that portion of the configuration will be given.

With the thus arranged photographing system according to this embodiment, a detailed explanation will now be given for that part of the operation that differs from the operation performed when the communication circuit 103 and the transfer buffer memory 116 are mounted on the media card 101.

First, when the camera 102' is powered on, as in the first embodiment, the initialization process is performed by the control circuit 105, which is then shifted to the standby state J201 to wait for an instruction from a user. Then, when the user selects a menu by manipulating the menu switch of the switch 109, the control circuit 105 is shifted to the menu selection state J202, whereat an examination is performed of the media card 101' that is loaded in the camera 102' (step S1001 in FIG. 10).

When it is ascertained that the media card 101' includes only nonvolatile memory 104 (step S1002), only the communication functions incorporated in the camera 102' are displayed on the screen menu of the image display LCD 110 (step S1004). Otherwise, when it is ascertained that the media card 101' includes a communication circuit, not only are the options provided at step S1004 displayed, but an option is added to the screen menu for the communication function provided by the media card 101' (step S1003).

The user then selects one of the communication functions listed on the screen menu to determine the use of either the communication circuit 103 incorporated in the camera 102' or the communication circuit on the media card 101'. If the user selects the function provided by the communication circuit on the media card 101' (step S1005), the same operation as in the first embodiment is performed (step S1006).

If, however, the user selects the function provided by the communication circuit 103 incorporated in the camera 102' (step S1007), the control circuit 105 is shifted to the communication control state J203 and exercises the following communication control (step S1008). For this communication control communication destinations are displayed, as in the first embodiment, and when a communication destination is selected from communication enabled terminals, the connection is established. Then, when the user manipulates the photographing switch of the switch 109, the control circuit 105 is shifted to the photographing-processed image confirmation state J204, and fetches a photographed image in the same manner as in the first embodiment. Until the user selects image data transmission by manipulating the switch 109, the control circuit 105, while in the photographing-processed image confirmation state J204, waits for an instruction for the next operation.

When the user selects image data transmission, the control circuit 105 is shifted to the data transmission/storage process state J205, and writes data, such as a file name and a storage date, in the nonvolatile memory 104. Then, the length of the data that can be transmitted at one time from the transfer buffer memory 116, which is the buffer for the communication circuit 103, is set as the transfer count for the IC card interface circuit 106 of the camera 102'. Further, the media card 101' and the communication circuit 103 are together designated a data transmission path, and a transmission instruction signal is transmitted to the IC card interface circuit 106 of the camera 102'.

Upon receiving this instruction, the IC card interface circuit 106 transmits image data having the designated length to the transfer buffer memory 116. Then, when the transmission has been completed, the IC card interface circuit 106 outputs a transfer complete signal to the control circuit 105.

Thus, the communication circuit 103 in the camera 102' receives data from the encode buffer memory 107 via the transfer buffer memory 116, and transmits the received data to the communication destination, while the IC card interface circuit 112 of the media card 101' transmits image data to the nonvolatile memory 104 and stores the data therein.

This process is repeated until the transmission of all the necessary image data has been completed. Then, after all the image data have been transmitted, the control circuit 105 relinquishes processing control of the imaging circuit 113, the encode buffer memory 107, the frame memory 114, the image codec 111 and the IC card interface circuit 106.

Thereafter, the communication circuit 103 is activated to initiate communication with an external device. And as in the first embodiment, since the imaging circuit 113, the encoded buffer memory 107, the frame memory 114, the image codec 111 and the IC card interface circuit 106 are not required for the transmission of the encoded image data, these components are released. Then, when the communication with the external device has been completed, the processing is terminated, and the control circuit 105 is shifted to the standby state J201.

As is described above, according to the photographing system in this embodiment, the transfer buffer memory 116, which has sufficient storage capacity to store image data obtained by the camera 102', is provided for the camera 102'. Therefore, when image data to be transmitted by the camera 102' is temporally transferred to the transfer buffer memory 116 at high speed, the continued use in this instance of the encode buffer memory 107, which is employed for the signal processing performed by the camera 102', is rendered unnecessary in a short period of time.

In addition, since the image data to be transmitted by the camera 102' is stored in the transfer buffer memory 116, and since the transfer buffer memory 116 is connected to the communication circuit 103, if during the communication the line connection is broken for some reason and the retransmission of data is required, the camera 102' need only issue a communication instruction to the communication circuit 103. Thus, the unnecessary transfer of data to the communication circuit 103 can be eliminated, and the consumption of power can be reduced.

Furthermore, when the control of the power for the communication circuit 103 of the camera 102' is exercised independently of the control of the power for the camera 102', immediately after the image data obtained by the camera 102' has been transmitted to the communication circuit 103, the user can power off the camera 102', without having to take into consideration, or having any knowledge of, the time at which the communication will actually be completed. Therefore, the user can be relieved of the responsibility for the operation of the camera 102' in as short period of time, and in addition, the unnecessary consumption of power for camera 102' functions that are not required can be reduced.

[Another Embodiment]

(1) In the above embodiments of the invention, when all image data have been transmitted, the control circuit 105 of the camera 102 relinquishes control of predetermined camera 102 components used for communication control. And at this time, since thereafter the power circuit 115 powers off those components that are no longer needed, the unnecessary consumption of power can be prevented.

(2) In the above embodiments, predetermined components of the camera 102 are released after all the image data have been transmitted and the power to them is switched off. At this time, while the power to the transfer buffer memory 116 and the communication circuit 103 is maintained on until the communication with an external device is completed, the unnecessary consumption of power can be prevented, and during the data communication the user can be relieved of responsibility for the operation.

(3) In the embodiments, the connection with other party during the communication is established while in the communication control state J203. The timing for the establishment of the connection is not limited to this, however, and the connection can be established after an image has been selected and a transmission instruction has been received.

(4) In the embodiments, with the configurations in FIGS. 1 and 9, during the communication data is automatically stored in the nonvolatile memory 104 of the media card 101. However, when an option not to store image data is added to the menu, the user can determine whether the data is to be stored.

(5) In the embodiments, the communication circuit 103 is selected, and the control circuit 105 of the camera 102 is shifted to the standby state J201. Since the communication state selection can be canceled in each state, after the communication has been ended, the control circuit 105 can be shifted either to the menu selection state J202 or to the communication control state J203 for the continuous performance of the communication unless the process is canceled.

(6) In the embodiments, the photographing system comprising the media card and the camera is employed. However, an information processing apparatus (a personal computer, a portable information terminal, etc.) or an image forming apparatus (a printer) may be connected to the camera of the photographing system for the communication of data between the camera and the information processing apparatus, to display an image obtained by the camera on the display portion of the information processing apparatus, or to permit the image forming apparatus to print the image obtained by the camera.

The present invention may be employed for a system that is constituted by multiple apparatuses, or for a single apparatus. Further, the objective of the invention can also be achieved by supplying, to a system or an apparatus (or a CPU or an MPU), a storage medium on which software program code that implements the functions of the embodiments is recorded, and by permitting the system or the apparatus to read and execute the recorded program code.

In this case, the program code read from the storage medium provides the functions of the above described embodiments, and the storage medium on which the program code is recorded constitutes the present invention.

The storage medium for supplying the program code can be, for example, a floppy disk, a hard disk, an optical disk, a magneto-optical disk, a CD-ROM, a CD-R, a magnetic tape, a nonvolatile memory card or a ROM, or the program code can be downloaded via a network.

In addition, with the present invention it is not only possible for the functions of the previous embodiments to be provided through the execution of program code by the computer, but also, the program code can interact with an OS running on a computer, or with another software application, to provide the functions described in the above embodiments.

Furthermore, with the present invention, program code, read from a storage medium, can be written in a memory that is mounted on a function expansion board inserted into a computer, or in a function expansion unit connected to the computer, and in consonance with instructions in the program code, a CPU mounted on the function expansion board, or in the function expansion unit, can perform part or all of the actual processing required to implement the functions of the above described embodiments.

Figure 12:
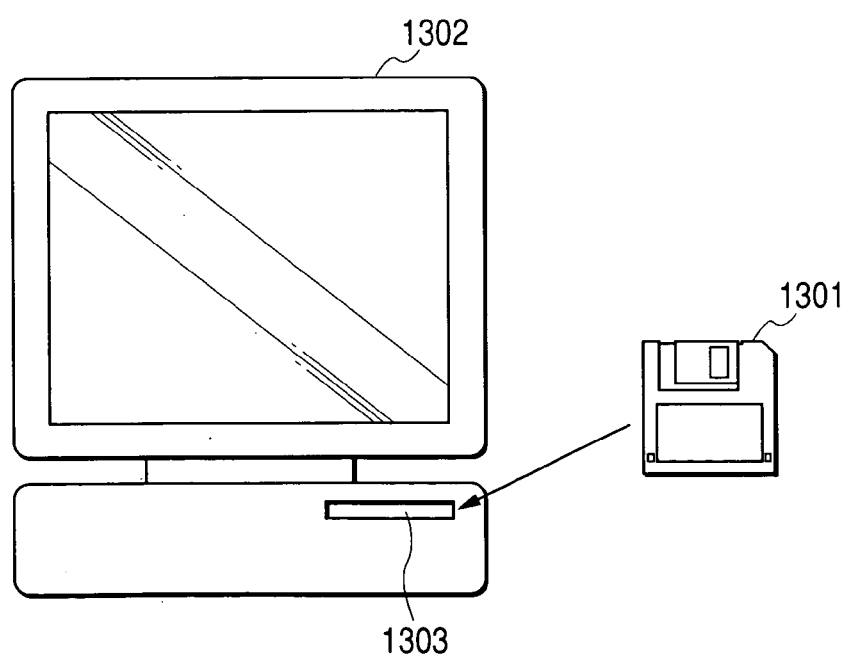
FIG. 12 is a diagram for explaining an example concept for the program for the execution of the processing method of the invention for image data communication and for the transmission of relevant data from a storage medium to an apparatus.

FIG. 12 is a diagram for explaining an example concept whereof a storage medium is used to supply to an apparatus the program of the invention that executes the processing method for the communication of image data, and relevant data for the program. The program of the invention that executes the processing method for the communication of image data, and relevant data for the program can be supplied by inserting a storage medium 1301, such as a floppy disk or a CD-ROM, into a storage medium drive slot 1303 of an apparatus 1302, such as a computer. Thereafter, for the execution of the program and the relevant data, either the program or the relevant data on the storage medium 1301 are temporarily installed on a hard disk and are loaded therefrom into a RAM, or the program and the data are loaded directly into the RAM without being installed on the hard disk.

When the photographing system in the first or second embodiment employs this program that executes the processing method for the communication of image data, for the execution of the program, either the program and the relevant data are supplied to the camera of the photographing system in the manner described while referring to FIG. 12, or the program and the relevant data are stored in advance in the camera of the photographing system.

Figure 11:
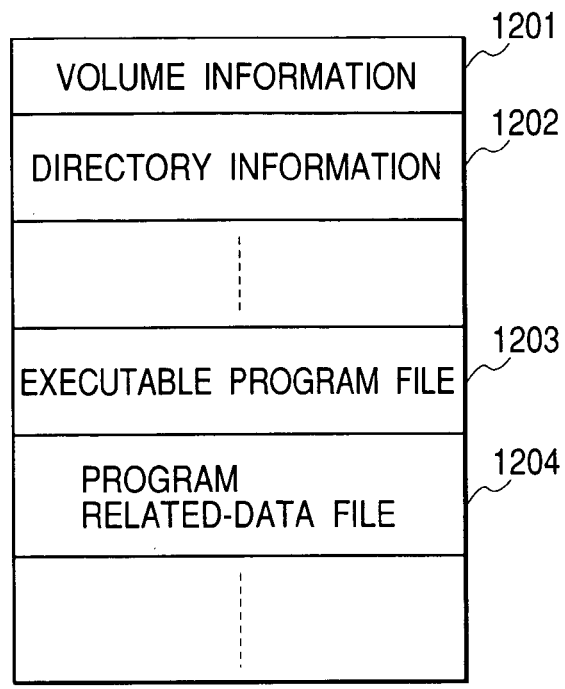
FIG. 11 is a diagram for explaining an example structure for a program for executing a processing method during image data communication and relevant data stored on a storage medium.

FIG. 11 is a diagram for explaining an example structure of the contents of a storage medium on which the program of the invention that executes the processing method for the communication of image data and the relevant data for the program are stored. The contents of the storage medium include, for example, volume data 1201, directory data 1202, a program execution file 1203 and a program relevant data file 1204. The program in this invention that executes the processing method for the communication of image data is provided as program code obtained based on the flowcharts in FIGS. 3 to 10.

As is described above, according to the invention, the image memory used for processing an input signal can be released in a short period of time.

In addition, since image data to be transmitted is first transferred to another memory, even when data must be retransmitted because for some reason a line connection is broken during communication, the image input apparatus need only issue a communication instruction to the communication means. Therefore, unnecessary transfer of data to the communication means can be eliminated and the consumption of power can be reduced.

Further, since the power control for the communication is exercised independent of the power control for the image input apparatus, a user can arbitrarily power off the image input apparatus without having to take into consideration, or having any knowledge of, the time at which the communication will actually be completed. Therefore, the user can be relieved of responsibility for the operation of the image input apparatus in a short period of time, and the unnecessary consumption of power by portions that are not required can be prevented.

What is claimed is:

1. An image input apparatus comprising:
    an encoder adapted to encode a captured image;
    a first storage device adapted to store the image encoded by said encoder;
    a connector adapted to connect to external storage media having an image storage memory, a transfer memory, and a communication unit for transmitting an image stored in the transfer memory; and
    a control device adapted to cause the image stored in said first storage device to be automatically stored in both the image storage memory and the transfer memory of the external storage media when the image is transferred to the external storage media for transmitting by the communication unit.

2. An image input apparatus according to claim 1, further comprising:
    a power supply device adapted to supply power; and
    a power supply controller adapted to cause said power supply device to stop supplying power to said encoder and said first storage device during transmission by the communication unit of the image to an external device.

3. An image input apparatus according to claim 1, further comprising:
    a power supply device adapted to supply power,
    wherein said power supply device continues to supply power to the communication unit and said transfer memory during transmission of the image by the communication unit, even if the power supply is instructed via a power switch operation to stop supplying power.

4. A control method for an image input apparatus, which has an encoder adapted to encode a captured image, a first storage device adapted to store the image encoded by the encoder, and a connector adapted to connect to external storage media having an image storage memory, a transfer memory, and a communication unit for transmitting an image stored in the transfer memory, the method comprising the steps of:
    determining whether or not the image is to be transmitted by the communication unit; and
    automatically storing the image stored in the first storage device that is determined to be transmitted by the communication unit into both the image storage memory and the transfer memory of the external storage media when the image is transferred to the external storage media for transmitting by the communication unit.

5. An image input apparatus according to claim 1, wherein said control device causes an image stored in said first storage device to be stored in the image storage memory and not to be stored in the transfer memory, in a case where the image input is not to be transmitted by the communication unit.

* * * * *